March 5, 1940.　　　　L. E. POOLE　　　　2,192,801
COIL POSITIONING DEVICE
Filed July 6, 1936　　　　7 Sheets-Sheet 1

INVENTOR
Lora E. Poole
BY
Spencer Hardman Fehr
his ATTORNEYS

March 5, 1940.  L. E. POOLE  2,192,801
COIL POSITIONING DEVICE
Filed July 6, 1936  7 Sheets-Sheet 2

INVENTOR
Lora E. Poole
BY
Spencer Hardman & Fehr
his ATTORNEYS

March 5, 1940.                L. E. POOLE                2,192,801
                        COIL POSITIONING DEVICE
                         Filed July 6, 1936              7 Sheets-Sheet 3

INVENTOR
Lora E. Poole
BY
Spencer Hardman Fehr
his ATTORNEYs

March 5, 1940. L. E. POOLE 2,192,801
COIL POSITIONING DEVICE
Filed July 6, 1936 7 Sheets-Sheet 4

INVENTOR
Lora E. Poole
BY Spencer Hardman & Fehr
his ATTORNEYS

March 5, 1940.　　　　L. E. POOLE　　　　2,192,801
COIL POSITIONING DEVICE
Filed July 6, 1936　　　　7 Sheets-Sheet 5

INVENTOR
Lora E. Poole
BY
Spencer Hardman & Fehr
his ATTORNEYS

March 5, 1940. L. E. POOLE 2,192,801
COIL POSITIONING DEVICE
Filed July 6, 1936 7 Sheets-Sheet 6

INVENTOR
Lora E. Poole
BY
Spencer Hardman & Fehr
his ATTORNEYS

March 5, 1940.    L. E. POOLE    2,192,801
COIL POSITIONING DEVICE
Filed July 6, 1936    7 Sheets-Sheet 7

INVENTOR
Lora E. Poole
BY
Spencer Hardman Fahr
his ATTORNEYs.

Patented Mar. 5, 1940

2,192,801

UNITED STATES PATENT OFFICE 2,192,801

COIL POSITIONING DEVICE

Lora E. Poole, Anderson, Ind., assignor to General Motors Corporation, Detroit, Mich., a corporation of Delaware Application July 6, 1936, Serial No. 89,158

8 Claims. (Cl. 29—84)

This invention relates to apparatus for assembling form-wound armature coils with an armature core.

In the type of armature construction to which the present invention relates, each armature coil has one of its active sides placed in the bottom of a core slot, and the other active coil side is received in another core slot and located upon an active side of another coil. In assembling armatures of this type, it has been the general practice successively to place one active side of each of the armature coils in the bottoms of successive core slots. This operation has been performed manually; and, in the case of one manufacturer, namely, applicant's assignee, it has been performed by power operated devices disclosed in the patent of Edward W. Collins, Lora E. Poole and Charles A. Nichols, No. 2,074,366, issued March 23, 1937. By means of hand operated tools such as disclosed in the patent of J. F. Cullen, No. 1,402,217, patented January 3, 1922, the other active coil sides have been successively positioned in the outer portions of the core slots. This Cullen patent discloses a hand operated machine which first aligns an outer active side of an armature coil with the receiving core slot and then forces the aligned coil side into the core slot and upon the active side of another armature coil which has been previously located in the bottom of the slot.

It is the primary aim and object of the present invention to provide a power-operated device for operating upon each of the outer active coil sides successively in such a manner as to align each outer active coil side with its receiving core slot and to force the aligned coil side into the core slot and upon the inner active side of another coil which has been previously deposited therein.

It is a further object of the present invention automatically to index the armature core so as to bring each of the outer active coil sides successively into position to be operated upon by the coil aligning and inserting means, whereby the machine may automatically and continuously operate until all outer active sides of the various armature coils have been placed in the core slots.

It is another object of the present invention to make provision in the device for interrupting the automatic insertion of the outer active coil sides at the will of the operator.

It is another object of the present invention to provide for facile location of an armature core such that the slots thereof may receive the automatically inserted outer active coil sides.

It is another object of the present invention to adapt the device for operation on a core, the slots of which are either parallel to the core axis or skewed relative thereto.

Further objects and advantages of the present invention will be apparent from the following description, reference being had to the accompanying drawings wherein a preferred embodiment of the present invention is clearly shown.

The present device incorporates a suitable base or table 30 on which the various operating mechanisms of the device are mounted. These mechanisms are, a rotor support A, an indexing device B, a depositing device C, a coil stretcher D and a controller E.

*Core support A*

Referring more particularly to Figs. 1, 5, 6 and 10, the table 30 provides a platform 32 on which a bracket 34 is mounted for rotation about a bushing 36, secured to the table 30. Bracket 34 is made fast on the bushing 36 in any adjusted angular position by means of a set screw 38, the tip 40 of which enters a V-shaped, peripheral groove 42 of said bushing (see also Fig. 5a). An additional set screw 44, threadedly received by a lug 46 of table 30, assists in arresting bracket 34 in any angularly adjusted position. The bracket 34 provides guideways 48 for a bearing bracket 50, adapted to receive and rotatably support one end of the armature shaft 52 of an armature assembly which includes said armature shaft 52 and a core 56, having longitudinal slots 58 which contain the first active sides 60 of form-wound armature coils 62 to be assembled with the armature core. These first coil sides 60 have been previously deposited in their respective core slots 58 in any convenient manner, and the coils themselves depend from the core substantially in the manner illustrated in Figs. 1 to 4, inclusive. It will be noticed in these figures and in Fig. 14 that the second active sides 64 of the coils 62 are most remote from the core 56. The bearing bracket 50 is provided with a roller 66 which projects in an elongated slot 68 of a hand lever 70, pivotally mounted at 72 to a bracket 74 on the table 30. By rocking lever 70 about its pivot 72, the bearing bracket 50 is moved linearly on the guideways 48, as can be readily understood.

Longitudinally adjustably mounted in a guide groove 80 of bracket 34 is a bearing bracket 82, journaling a sleeve 84 which has a central bore 86, terminating in a frusto-conical surface 88. A nut 90, threaded on sleeve 84, cooperates with an annular shoulder 92 of said sleeve to prevent longitudinal movement of the latter in its bearing bracket 82. Slidable in the central bore 86 of sleeve 84 is a shell 94, one end of which is frusto-conical and repeatedly split at equi-angular distances to provide jaws 96, adapted to cooperate with the frusto-conical surface 88 of sleeve 84 and grip the adjacent end of the armature shaft 52. The other end of shell 94 is threaded to a bar 98, receiving adjustable nuts 100 which are adapted to cooperate with diametrically opposite levers 102, pivotally mounted at 104 to lugs 106 of nut 90. Cooperating with the levers 102 is a cone 108 which is slidable and rotatable on bar 98 and provided with an annular groove 110, receiving diametrically opposite pins 112 of a shifter lever 114 which is connected to a lug 116 of the bearing bracket 82 by a link 118. Pressfitted or otherwise secured to the sleeve 84 is a spacer 120 against which the armature core 56 rests and through which the armature shaft 52 extends.

Figure 1:
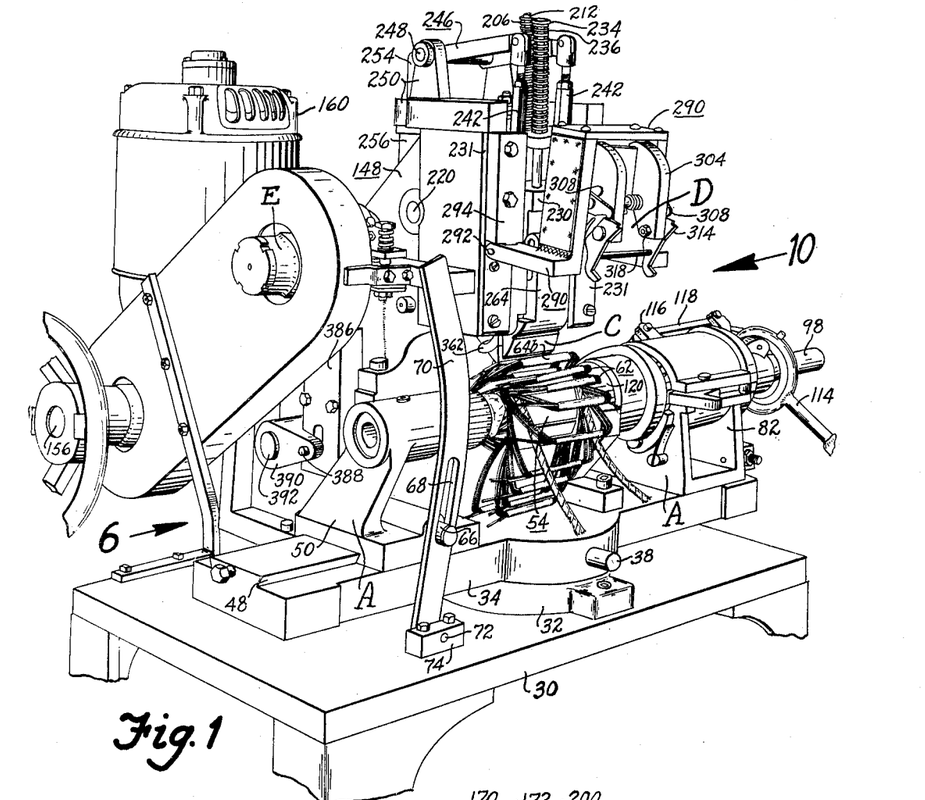
Fig. 1 is a perspective view of a device embodying the present invention.
Figures 2, 3, 4:
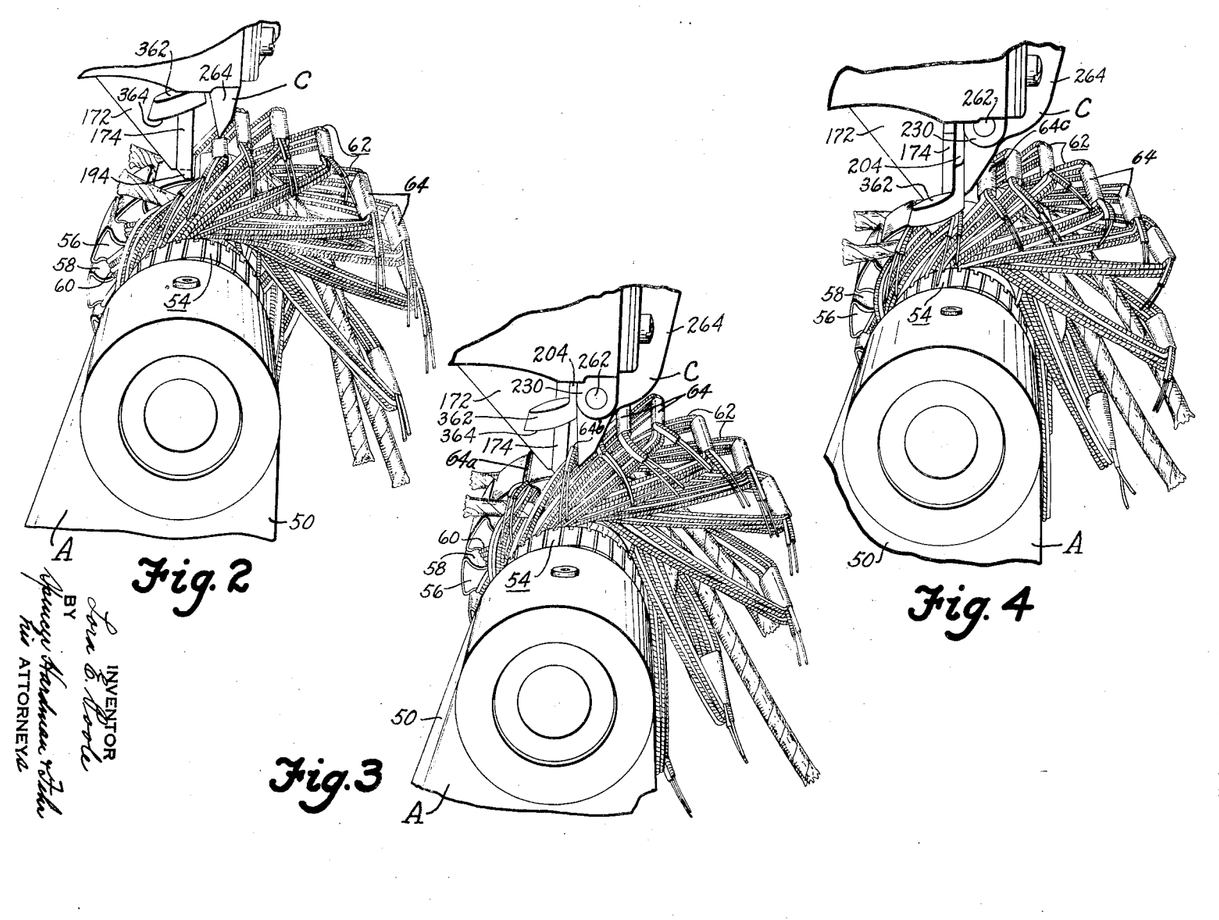
Figs. 2 to 4 inclusive, are enlarged fragmentary perspective views, illustrating the deposition of an active coil side in a core slot.
Figures 5, 5A, 11:
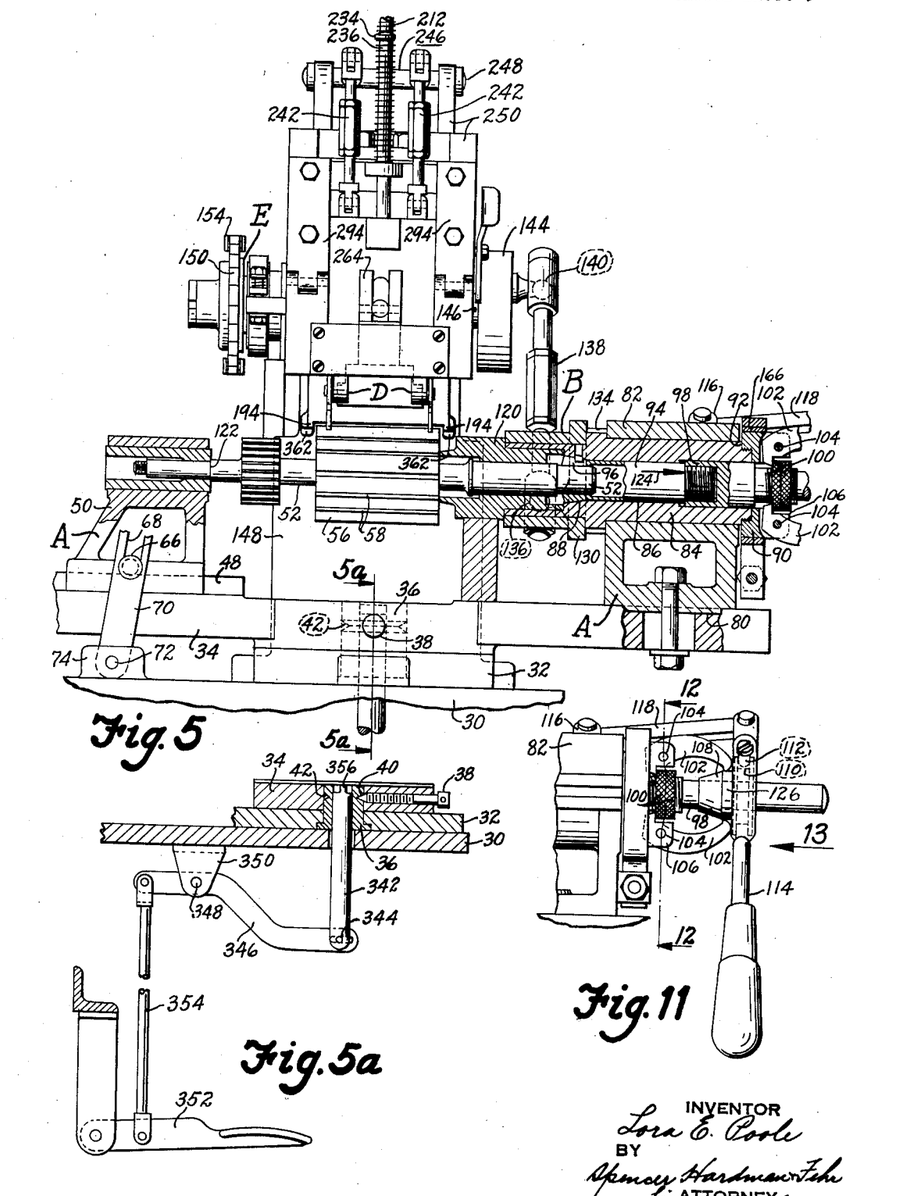
Fig. 5 is a fragmentary front elevation of the device, the core support thereof being shown in section.
Fig. 5a is a fragmentary section taken on the line 5a—5a of Fig. 5 and is drawn at a reduced scale.
Fig. 11 is a front elevation of that part of the device which is omitted at the right-hand end of Fig. 5.

To place an armature assembly 54 in its support, the operator withdraws bearing bracket 50 from the position shown in Figs. 1 and 5 in order to pass the armature shaft 52 through the spacer 120 and into engagement with the jaws 96. The bearing bracket 50 is then returned into the position shown in Figs. 1 and 5, in which it abuts an annular shoulder 122 of the armature shaft 52. The armature shaft 52 is finally coupled to the sleeve 84 by rocking lever 114 into the position shown in Fig. 11, whereby the cone 108 rocks the levers 102 in such directions that they move the nuts 100, and consequently bar 98 and shell 94, in the direction of arrow 124 in Fig. 5, thereby forcing the jaws 96 against the frusto-conical surface 88 of sleeve 84 and into gripping engagement with the adjacent end of the armature shaft 52. The cone 108 terminates in a cylindrical portion 126 against which the levers 102 bear when the jaws are in gripping engagement with the armature shaft, thus arresting these levers in jaw-gripping position, as can be readily understood. In order to remove an assembly 54 from the support, the operator rocks lever 114 into jaw-releasing position before he withdraws bearing bracket 50 from the armature shaft 52. The operator then grasps the armature assembly 54 and pulls the same endwise from the jaws 96 and spacer 120. The pull exerted by the operator on said assembly for removing the same is sufficient to break the gripping engagement between the armature shaft and the jaws 96.

*Indexing mechanism B*

Figures 10, 12:
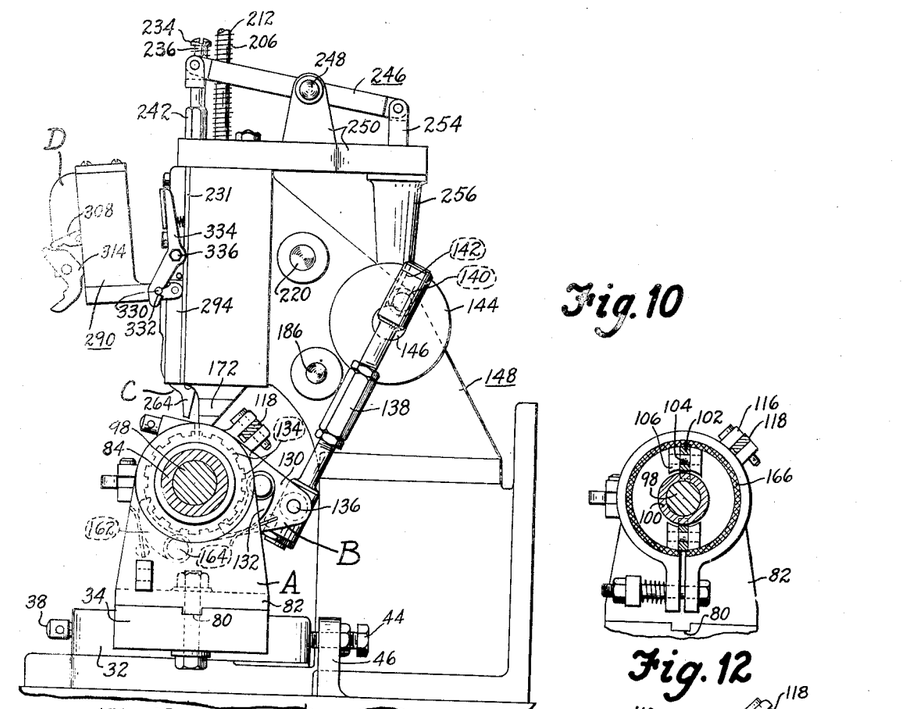
Fig. 10 is a fragmentary side elevation of the device as viewed in the direction of arrow 10 in Fig. 1.
Fig. 12 is a section taken substantially on the line 12—12 of Fig. 11.

Referring more particularly to Figs. 5 and 10, the sleeve 84 journals an arm 130 which carries a spring-urged pawl 132, cooperating with ratchet teeth 134 of sleeve 84. A lengthwise adjustable link 138 connects arm 130 with a crank pin 140 which is adjustably mounted in a radial slot 142 of a disc 144, mounted on one end of a rotatable shaft 146. This shaft 146 is journaled in suitable bearings, provided by a frame 148 which is mounted on the table 30. Freely rotatable on the other end of shaft 146 is a sprocket wheel 150 which may be drivingly connected with shaft 146 by a one revolution clutch 152, to be described later. A chain 154 drivingly connects sprocket wheel 150 with another sprocket wheel 155 which is mounted on the slow shaft 156 of any suitable reduction gearing 158, mounted on the frame 148. The fast shaft (not shown) of the reduction gearing 158 is driven by an electric motor 160 which is preferably housed together with the reduction gearing 158. Thus, during one-half revolution of disc 144 in clockwise direction as viewed in Fig. 10, pawl 132 indexes sleeve 84 and the armature assembly 54 which is coupled thereto by the intermediate jaws 96, while during the following half revolution of the disc 144 the pawl 132 rides idly over the ratchet teeth 134 of sleeve 84, the latter being prevented from following the receding pawl 132 by a spring-urged locking pawl 162 which is pivotally mounted at 164 to the bearing bracket 82. The adjustment of the crank pin 140 in the radial slot 142 of disc 144 determines the angular distance through which the armature assembly 54 is indexed during one revolution of disc 144, as can be readily understood. This angular distance through which the armature assembly is indexed is always equal to the angular distance between consecutive slots of an armature core. By adjusting the length of link 138, an indexing operation can be started in any desired angular position of the core slots. To prevent overtravel of the sleeve 84 after a completed indexing operation and in case the locking pawl 162 should not completely enter a ratchet tooth 134 when the indexing pawl 132 reverses its indexing cycle, a permanent brake 166 is applied to the periphery of the nut 90 which is secured to sleeve 84.

Coil depositing mechanism C

Figures 14, 17, 18:
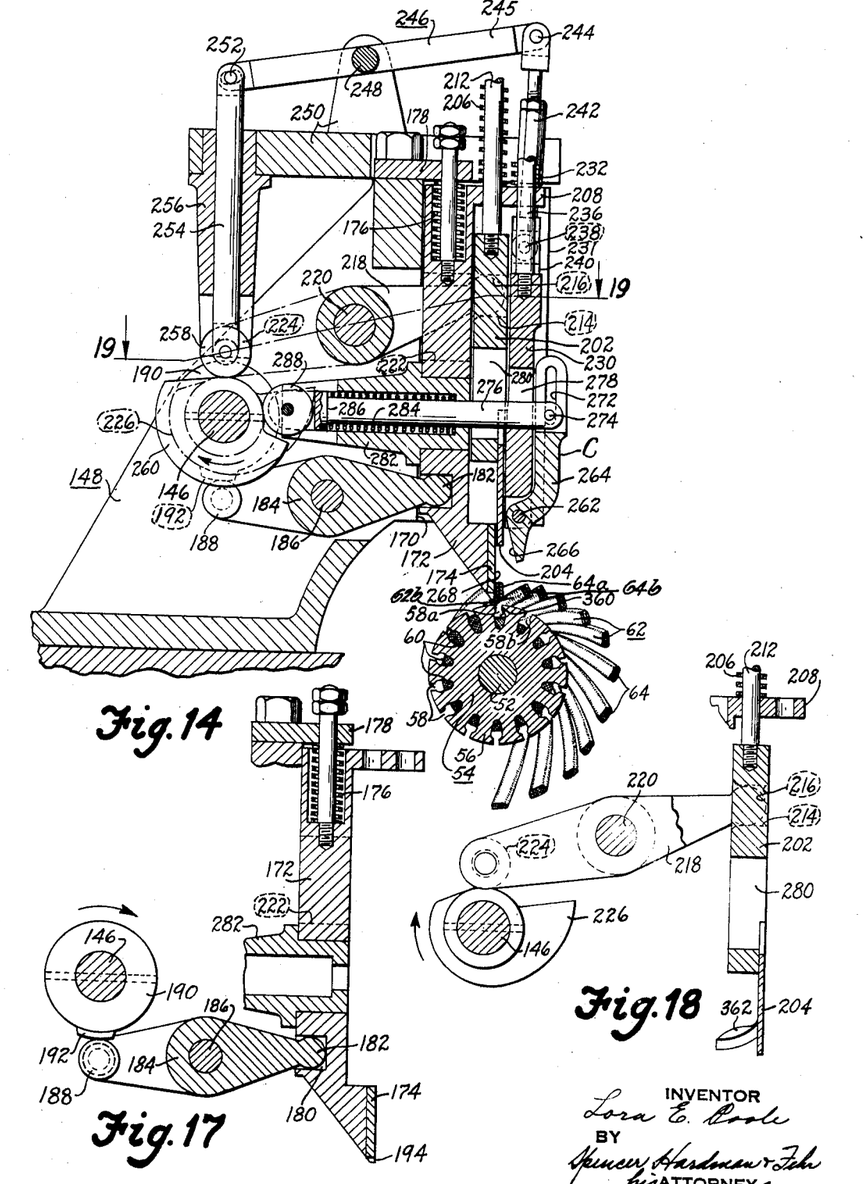
Fig. 14 is an enlarged fragmentary section, taken substantially on the line 14—14 of Fig. 19.
Figs. 17 and 18 are sectional views of certain cooperating elements of the device.
Figures 15, 16:
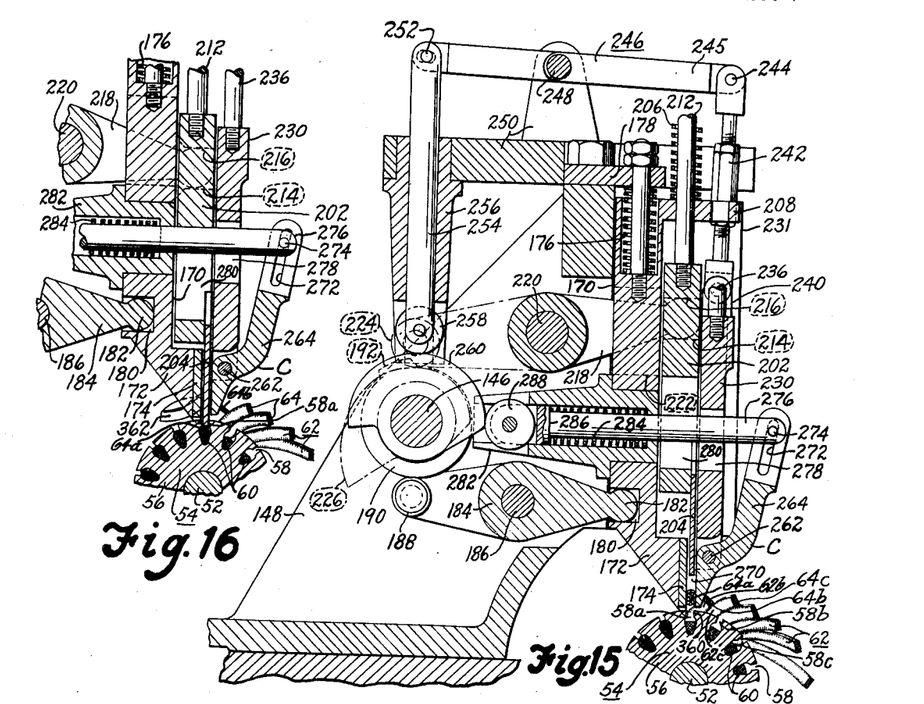
Figs. 15 and 16 are fragmentary sections similar to Fig. 14, showing certain elements of the device in different positions of operation, however.
Figure 19:
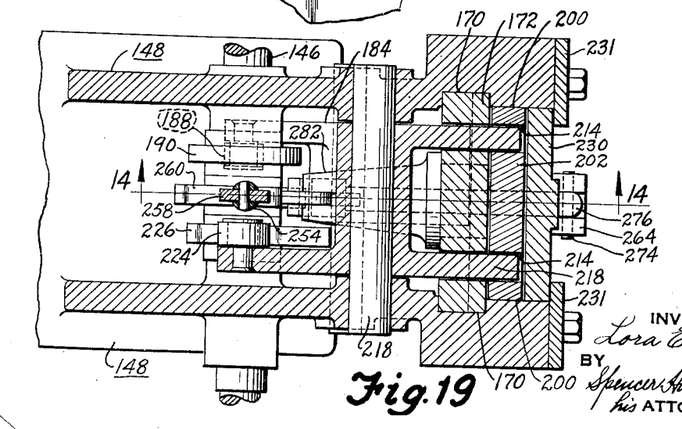
Fig. 19 is a fragmentary section, taken substantially on the line 19—19 of Fig. 14.

Referring more particularly to Figs. 14, 15, 16, 17 and 19, the frame 148 provides guide ways 170 for a coil guide 172, having a steel lining 174 which extends into close proximity to the periphery of a supported armature core 56 and parallel to the slots 58 thereof. A spring 176, bearing against a plate 178 on frame 148, normally urges the coil guide 172 toward the armature core. This guide 172 is provided with a socket 180 to receive the roller-shaped end 182 of a lever 184 which is journaled on a shaft 186, suitably secured to the frame 148. The other end of lever 184 carries a roller 188 which cooperates with a cam 190 on the earlier mentioned shaft 146. This cam 190 has a short and comparatively low lobe 192 (see Fig. 17) which is adapted to raise the guide 172 from the position shown in Fig. 16 to that shown in Fig. 14. As best shown in Figs. 5 and 15, the steel lining 174 of the coil guide 172 is provided with two depending portions 194 which are to straddle the armature 56 and provide guiding surfaces beyond the adjacent, sharp meeting points of a core slot, the core periphery and the core end faces.

Slidable on the coil guide 172 and linearly guided within the parallel side walls 200 of the frame 148 is a plate 202, carrying at its lower end a blade 204 which moves along the steel lining 174 of the coil guide 172. Plate 202 is normally urged away from the supported armature core 56 by means of a compression spring 206 which is interposed between an extension 208 of the coil guide 172 and a nut or collar 210 of a rod 212 which is secured to plate 202 and passes through said extension 208. Plate 202 is also provided with sockets 214, receiving the roller-shaped ends 216 of a lever 218 which is journaled on a shaft 220, suitably secured to the frame 148. Lever 218 projects through an elongated slot 222 in the coil guide 172 so as not to interfere with the latter. The other end of lever 218 carries a roller 224 (see Fig. 18) which cooperates with a cam 226 on the shaft 146. Rotation of cam 226 causes reciprocation of plate 202 to and from the supported core 56, as can be readily understood.

Slidable on plate 202 and guided by the side walls 200 of frame 148 and gib plates 231 thereon is a member 230 which is normally urged away from the supported core 56 by a compression spring 232, bearing against the extension 208 of coil guide 172 and a nut or collar 234 on a rod 236 which is secured to said member 230. Pivoted at 238 to spaced lugs 240 of member 230 are lengthwise adjustable connecting rods 242 which are also pivotally connected at 244 to the bifurcated half 245 of a lever 246, fulcrumed at 248 on a bracket 250 which is suitably mounted on top of the frame 148. The other end of lever 246 is floatingly pivotally connected at 252 to a bar 254 which is guided in a post 256, depending from the bracket 250. The lower end of bar 254 carries a roller 258 which cooperates with a cam 260 on the shaft 146. Rotation of cam 260 in clockwise direction as viewed in Fig. 15 causes reciprocation of member 230 to and from the supported armature core 56, as can be readily understood.

Pivoted at 262 to member 230 is a companion coil guide 264, the plane face 266 of which is adapted to cooperate with the face 268 of the steel lining 174 on coil guide 172 in forming the side walls of a guide groove 270, the bottom of which is formed by the blade 204, as best shown in Fig. 15. Coil guide 264 is provided with an elongated slot 272 which receives a pin 274 of a bar 276, extending through recesses 278 and 280 of member 230 and plate 202, respectively, and is guided for linear movement in a post 282 which extends from the coil guide 172. This post contains a compression spring 284 which bears against a shoulder 286 of bar 276 and urges the same with its roller 288 into engagement with the earlier mentioned cam 260. This cam 260 is not only adapted to reciprocate member 230 but also to rock coil guide 264 about its pivot 262 from the position shown in Fig. 14 to that shown in Fig. 15, and vice versa.

Coil stretcher D

It is the general practice to dimension form-wound coils so that they will be stretched when inserted in their respective slots of an armature core, thus preventing the inserted coil sides from jumping out of their slots when the armature spins in a dynamo electric machine. A coil stretcher is incorporated in the present device the function of which is to stretch the coil, the second active side of which is the first to be inserted in the core, until the receiving core slot is brought into substantial alignment with the depositing mechanism C by the operator, whereupon the coil is automatically released from the stretcher and, in its effort to recover, jumps into operative engagement with the obstructing depositing mechanism C. The automatic release of the coil from the stretcher is an indication to the operator that the receiving core slot is in substantial alignment with the depositing mechanism C, therefore to stop further rotation by hand of the armature assembly in its support and accurately to align said core slot with the mechanism C in a manner to be explained hereafter. As mentioned above, this coil stretcher is merely used for stretching that coil the second active side of which is the first to be inserted in a core, and for substantially aligning the receiving core slot with the depositing mechanism; thereafter the depositing mechanism automatically stretches the remaining coils during indexing steps of the armature assembly. Figs. 7, 8 and 9 illustrate the coil stretcher. A rectangular frame 290 is pivoted at 292 to members 294 which are mounted on top of the gib plates 231 (see also Fig. 1). Two opposite sides 296 of frame 290 are provided with slots 298 which slidably receive a block 300, retained therein by cover plates 302. Depending from block 300 are parallel plates 304 which journal a shaft 306. Mounted on the projecting ends of shaft 306 are latch members 308, each having a notch 310 adapted to interlock with the finger 312 of a bell crank lever 314. These levers 314 which are pivotally mounted at 316 to the depending plates 304, are connected by a tie 318 (see Fig. 1). The depending portions 320 of the levers 314 are adapted to engage the second active coil side 64a to be first inserted in the core, as is shown in Fig. 7. An arm 322 is also mounted on the shaft 306 and a torsion spring 324 embraces said stub and is so anchored with its ends to block 300 and arm 322 as to normally rock the latter, together with shaft 306 and latches 308, clockwise as viewed in Fig. 7. Block 300 with the elements carried thereby is normally urged into the position shown in Fig. 8 by a compression spring 326 which is interposed between block 300 and an end wall 328 of frame 290. The coil stretcher is normally retained in the position shown in Fig. 10, in which a pin 330 of frame 290 registers with a notch 332 of a latch 334, and is pivoted at 336 to one of the members 294. The gravity of the coil stretcher prevents its release from the latch 334, as can be readily understood. In using the coil stretcher, the operator trips latch 334 to release the stretcher for gravity descent into the operative position shown in Figs. 7 and 8. The operator then rotates a newly placed armature assembly 54 in its support 50, 82 whereby the second coil side 64a to be first deposited is stretched to such an extent as to overcome the compression of spring 326 and the block 309 with the elements carried thereby is forced from the position shown in Fig. 6 into and beyond the position shown in Fig. 7 until arm 322 strikes against the curved surface 340 of the coil guide 264. When this takes place, arm 322 together with shaft 306 and the latches 308 are rocked counter-clockwise as viewed in Fig. 7, whereby the levers 314 become released from said latches and immediately rock into the position shown in Fig. 8 under the tension of the stretched coil 62, which then tends to recover but is immediately stopped by the obstructing coil guide 172, as shown in Fig. 8. Coil 62 is now substantially under the proper tension which is desired in the coil when assembled with the armature core. At the instant when the coil 62 is released from the stretcher in the just explained manner, the core slot 58a, which is to receive coil side 64a, is in substantial alignment with the latter. For accurately aligning core slot 58a with coil side 64a, the operator makes use of a locator 342 (see Fig. 5a) which slides through the bushing 36 on table 34 and is floatingly pivotally connected at 344 to a lever 346, which is pivoted at 348 to a suspended bracket 350 and connected to a suitable foot pedal 352 by means of a link 354. The locator 342 is provided with a tooth 356 which, when brought to register with the adjacent core slot 58, assures that the beforementioned core slot 58a is in accurate alignment with coil side 64a. Only after the armature core is thus accurately located does the operator manipulate lever 114 in order to cause the jaws to grip the armature shaft 52 and thus couple the same to the sleeve 84 which forms part of the indexing mechanism. The stretcher is preferably returned into the inoperation position shown in Fig. 10 before the operator starts the device.

As to the cooperation between the coil guides 172, 264 and the staking blade 204, the cams 190, 226 and 260 on shaft 146 are so coordinated that the following steps take place during one revolution of said shaft. Coil guide 172 is first moved by cam 190 into close proximity to the core periphery from the position shown in Fig. 14 to that shown in Fig. 15. The coil side 64a, which is in yielding engagement with the guide 172, follows the latter in its descent and is thus brought closer to the narrow entrance 360 of the core slot 58a. Next, cam 260 causes member 230 to descend from the position shown in Fig. 14 to that shown in Fig. 15, without causing any rocking motion of the coil guide 264. After member 230 has descended to its lowermost position and upon continued rotation of cam 260 into the position shown in Fig. 15, the latter causes coil guide 264 to rock from the position in Fig. 14 to that shown in Fig. 15, thereby squeezing coil side 64a sufficiently to permit its passage through the core slot entrance 360. This condition is illustrated in Fig. 15. While coil side 64a is thus squeezed between the coil guides 172 and 264, cam 226 causes the plate 202 with its staking blade 204 to descend from the position shown in Fig. 15 to that shown in Fig. 16, thereby forcing the squeezed coil side 64a from the coil guides 172, 264 and into the aligned core slot 58a on top of a previously deposited first coil side 60 of another armature coil 62. Continued rotation of the cams causes substantially simultaneous withdrawal of member 230 and plate 202 from their position shown in Fig. 15 to that shown in Fig. 14, and subsequent rocking of coil guide 264 into the position shown in Fig. 14 as well as withdrawal of coil guide 172 into the position shown in the same figure. This completes one operation of the coil depositing mechanism C at the end of one complete revolution of the cam shaft 146. The home position of the cam shaft 146 and of the coil depositing mechanism C is illustrated in Fig. 14.

As more particularly shown in Figs. 2 to 5 inclusive, the staking blade 204 carries two spaced packing shoes 362 which are in close proximity to the core ends and adapted to engage and force coil end portions adjacent an inserted second active coil side within the confines of the core periphery, as can be readily understood. The engaging surface 364 of each shoe 362 is inclined to correspond with the desired inclination of said coil end portions relative to a plane parallel to and extending through both inserted active sides of the coil.

Controller E

Figure 6:
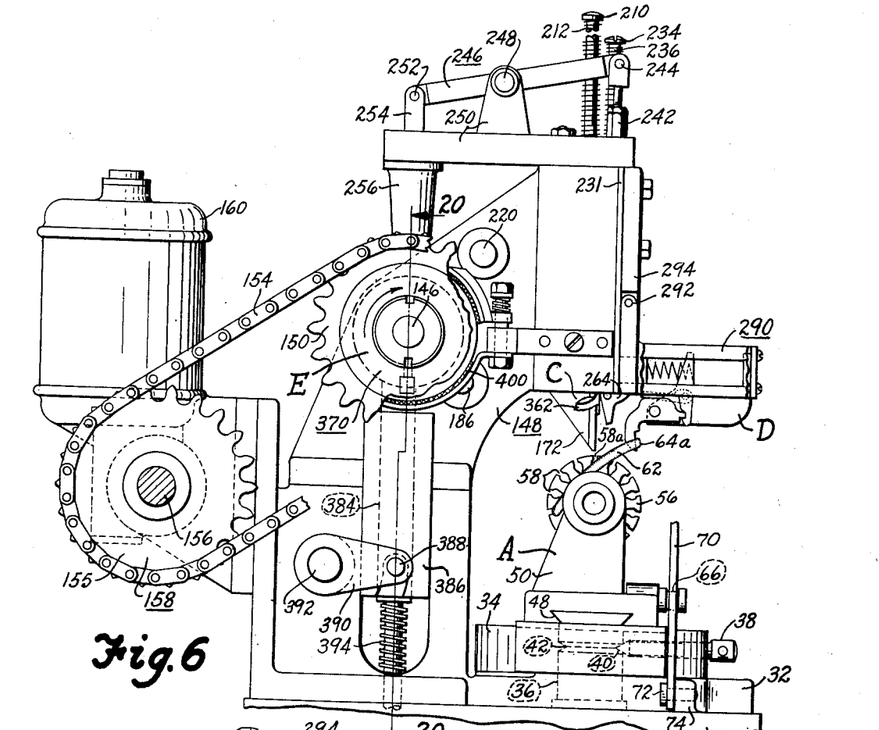
Fig. 6 is a fragmentary side elevation of the device as viewed in the direction of arrow 6 in Fig. 1.
Figures 7, 8, 9:
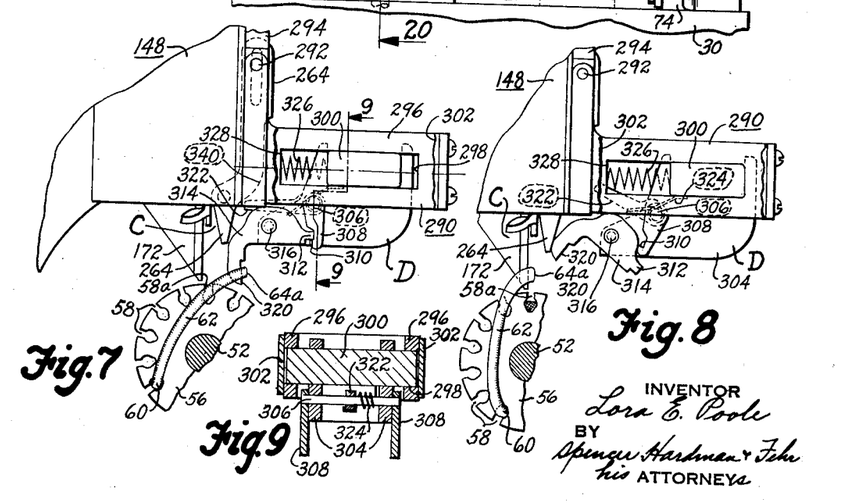
Figs. 7 and 8 are enlarged fragmentary views of part of the device, illustrating more particularly the aligning of the first coil side to be deposited with its assigned core slot.
Fig. 9 is a section taken on the line 9—9 of Fig. 7.
Figures 13, 21:
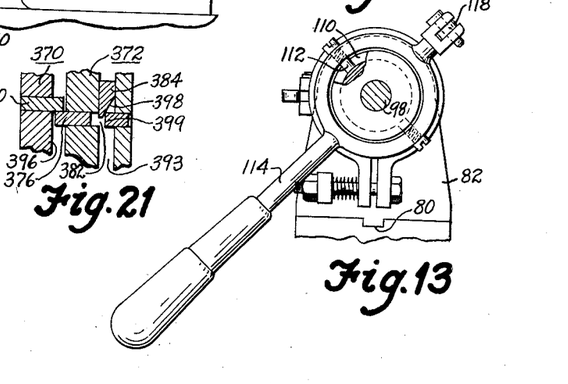
Fig. 13 is a fragmentary end elevation of the core support as viewed in the direction of arrow 13 in Fig. 11.
Fig. 21 is a section, taken substantially on the line 21—21 of Fig. 20.
Figure 20:
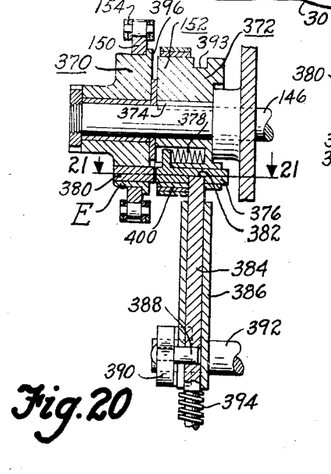
Fig. 20 is a fragmentary section, taken substantially on the line 20—20 of Fig. 6.

Referring more particularly to Figs. 6, 20 and 21, the earlier mentioned one-revolution clutch 152 on the cam shaft 146 comprises a driving member 370 and a driven member 372. The driven member 372 is keyed at 374 to the cam shaft 146 and carries an axially slidable pin 376 which is normally urged toward the driving member 370 by a compression spring 378. The driving clutch member 370 is incorporated in the earlier described sprocket wheel 150 which is freely rotatable on the cam shaft 146 and carries a projecting pin 380. Pin 376 of the driven member 372 is provided with a notch 382, adapted to cooperate with a reciprocable cam bar 384 which is guided in a boss 386 of the frame 148 and connected at its lower end at 388 to an arm 390, mounted on a stub 392 which is suitably journaled in the frame 148 and rocked by a foot pedal and connecting linkage (neither shown). Cam bar 384 is normally urged into an annular groove 393 of the driven member 372 and into registry with the notch 382 of pin 376 by a suitably applied compression spring 394. In the idle or home position of the device, the cam bar 384 projects into the notch 382, thereby holding the spring-urged pin 376 withdrawn from the pin 380 of the spinning clutch member 370. When starting an operation of the device, the operator actuates the mentioned clutch pedal (not shown) to withdraw cam bar 384 from the notch 382 of pin 376, whereupon the latter is immediately forced into engagement with the adjacent face 396 of the driving clutch member 370 and is drivingly engaged by the spinning pin 380 for one complete revolution. The tripping of the clutch pedal by the operator is only momentary so that the spring 394 is free to yield the cam bar 384 into the annular groove 393 of clutch member 372 before the latter completes one revolution. Shortly before the driven clutch member 372 completes one revolution, the cam surface 398 of bar 384 engages a wall 399 of the notch 382 in pin 376 and gradually withdraws said pin from driving engagement with pin 380 until they are out of driving engagement with each other after one complete revolution of the driven clutch member 372. To prevent over-travel of the driven clutch member 372 and consequent reengagement of the clutch, a permanent friction brake 400 is applied. The illustrated clutch 372 is of a well-known construction and no novelty is claimed in the same.

*Mode of operation*

The operator places an armature assembly 54 in the support 50, 82 in the earlier described manner. Prior to coupling the armature shaft 52 of the assembly to the jaws 96, the operator trips latch 334 to permit the earlier described stretcher D to descend into the operative position shown in Fig. 6. The operator then turns the supported assembly, until coil side 64a, the first to be finally assembled with the armature core 56, is released from the stretcher D after having been stretched thereby. This indicates to the operator that the receiving core slot is in substantial alignment with the coil depositing mechanism C, wherefore he now ceases to rotate the assembly and accurately aligns said receiving core slot with said mechanism by means of the earlier described locator 342. After returning the stretcher D into the inoperative position in Fig. 10, the device is started by causing engagement of the one-revolution clutch 152, resulting in insertion of the coil side 64a into the aligned core slot 58a by the coil depositing mechanism C. After this mechanism has returned to the home position shown in Fig. 14, the assembly 54 is indexed to align the consecutive core slot 58b with the coil depositing mechanism C. During this indexing step, the next coil side 64b engages the coil guide 172 and is stretched thereby. This completes one revolution of the cam shaft 146 and automatic disengagement of the one-revolution clutch 152 takes place. However, if the operator keeps his foot on the earlier described clutch pedal (not shown), the clutch is not disengaged after one complete revolution, but continues to rotate cam shaft 146 through another revolution, resulting in deposition of coil side 64b of coil 62b in the core slot 58b and alignment of coil side 64c of the following coil 62c with the next core slot 58c. By leaving his foot on the clutch pedal, the operator may render the device continuously automatic until the last coil side is deposited in the last core slot, as can be readily understood. After all coils have thus been finally assembled with the armature core, the assembly 54 is removed from the support 50, 82 and a new one placed therein in the earlier described manner.

Figure 22:
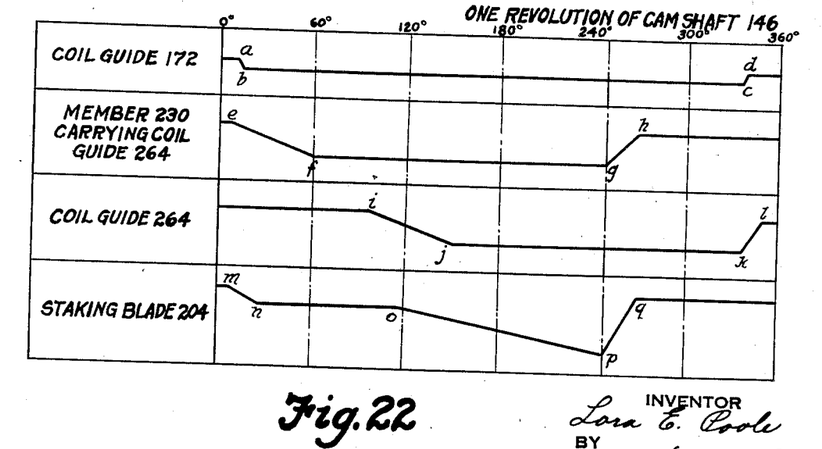
Fig. 22 is a chart, graphically illustrating the timed cooperation between various cooperating elements of the device.

Fig. 22 illustrates diagrammatically the movements of certain operating elements of the device. All these movements take place during one complete revolution of cam shaft 146. Line a—b indicates the movement of the coil guide 172 into the position shown in Fig. 15, while line c—d indicates the retraction of said coil guide into the position shown in Fig. 14. Line e—f indicates the movement of the coil guide carrying member 230 into the position shown in Fig. 15, while line g—h indicates the retraction of said member into the position shown in Fig. 14. Line i—j indicates the rocking of coil guide 264 into the position shown in Fig. 15, while line k—l indicates the rocking of said coil guide into the inoperative position shown in Fig. 14. Line m—n indicates a partial descent of the staking blade 204 into the position shown in Fig. 15 and line o—p indicates the continued descent of said staking blade into the position shown in Fig. 16. Line p—q finally indicates the retraction of the staking blade into the position shown in Fig. 14.

While the embodiment of the present invention as herein disclosed, constitutes a preferred form, it is to be understood that other forms might be adopted, all coming within the scope of the claims which follow.

What is claimed is as follows:

1. A device of the character described comprising, in combination, a support for an armature assembly including a slotted core and coils with one active side inserted in the core slots; mechanism for stretching all coils except the first to be inserted to align their second active sides with their designed core slots and inserting all aligned coil sides in the core slots; means for stretching the first coil to be inserted upon manual rotation of the assembly in its support, said means releasing said first coil into operative engagement with the mechanism upon operative alignment of the receiving core slot with said mechanism; and means for arresting the assembly against rotation in its support.

2. A device of the character described comprising, in combination, a support for an armature assembly including a slotted core and coils with one active side inserted in the core slots; mechanism for aligning the second active side of a coil with its designated core slot; a coil stretcher yieldingly urged away from said mechanism and adapted to engage the second active side of a coil, said stretcher being yieldingly urged into coil releasing position and moved toward the mechanism by the engaging coil side upon relative rotation between core and mechanism in a certain direction; latching means holding the stretcher in coil retaining position; and means responsive to movement of the stretcher toward the mechanism through a preassigned distance for releasing the latching means, the released coil side then contracting into operative engagement with the mechanism.

3. A device of the character described comprising, in combination, means for rotatably supporting an armature assembly including a slotted core and coils with one active side inserted in the core slots; a relatively stationary plate extending parallel to the core slots and in close proximity to the core periphery; a stretcher yieldingly urged away from the plate and adapted to engage the second active side of a coil, said stretcher being yieldingly urged into coil releasing position and moved toward the plate by the engaging coil side upon rotation of the core in a certain direction; latching means for holding the stretcher in coil retaining position; and relatively stationary means engaging and releasing the latching means during movement of the stretcher toward the plate whereupon the released coil side contracts into operative engagement with the plate, said releasing means being so correlated with the latching means as to release the latter when the receiving core slot is in alignment with the plate.

4. In a device of the character described, the combination of a mechanism for depositing the second active coil sides in the slots of a core, said device including spaced parallel plates to guide a coil side into an aligned core slot; a support for the core, said support being rotatable about an axis extending at right angles to the core axis and substantially midway between the ends of the supported core; and means for arresting the support against rotation in any adjusted angular position.

5. A machine for assembling dynamo armatures comprising, in combination, a support for an armature assembly including a slotted core and coils with one active coil side of each coil inserted in each slot; a guide engageable by an uninserted coil side; indexing mechanism for periodically rotating the assembly to bring an uninserted coil side into engagement with said guide and to stretch said coil side upon continued rotation of said assembly until the proper core slot is located in alignment with said uninserted coil side; a disengageable chuck for gripping the armature shaft and connecting it to said mechanism; means for controlling the chuck to permit manual rotation of the armature core on its support and with respect to the guide; a device located in advance of said guide for engaging and holding the first uninserted coil side as the armature and coils are being rotated manually to align the first core slot to be filled with the first uninserted coil side, said first coil, after engagement being stretched by the continued manual rotation of the armature; means to release said device from said coil; means operable by a predetermined pressure of said coil against said device for operating said release means, said coil thereafter engaging said guide; means for compressing said uninserted coil side against said guide; mechanism for inserting said compressed coil side in its coil slot; and power means for periodically operating said compressing means and inserting mechanism in between the period of operation of said indexing mechanism for inserting consecutive uninserted coil sides into successive coil slots aligned by said indexing mechanism, said device in connection with the manual rotation of the armature being adapted to adjust said armature with respect to said indexing mechanism.

6. A machine for assembling dynamo armatures comprising, in combination, a support for an armature assembly including a slotted core and coils with one active coil side of each coil inserted in each slot; a guide engageable by an uninserted coil side; indexing mechanism for periodically rotating the assembly to bring an uninserted coil side into engagement with said guide and to stretch said coil side upon continued rotation of said assembly until the proper core slot is located in alignment with said uninserted coil side; a stationary frame; three adjacent, parallel supports carried by said frame, an outer one providing said guide, the other outer one supporting a second guide for lateral movement with respect to the first mentioned guide, the intermediate support carrying a blade for forcing a coil side into a core slot; a single power driven shaft carried by the frame; a cam on said shaft and a rocker arm associated therewith for moving the support of the first mentioned guide; a second cam on said shaft and a rocker arm associated therewith and extending through an opening in the support for the first mentioned guide and operatively connected with the intermediate support; a third cam on said shaft and means for transmitting movement from said cam to the support for the second guide; and means extending through all three supports and operated by a cam on the shaft for moving the second guide laterally with respect to the first guide.

7. A machine for assembling dynamo armatures comprising, in combination, a support for an armature assembly including a slotted core and coils with one active coil side of each coil inserted in each slot; a guide engageable by an uninserted coil side; indexing mechanism for periodically rotating the assembly to bring an uninserted coil side into engagement with said guide and to stretch said coil side upon continued rotation of said assembly until the proper core slot is located in alignment with said uninserted coil side; a stationary frame; three adjacent, parallel supports carried by said frame, an outer one providing said guide, the other outer one supporting a second guide for lateral movement with respect to the first mentioned guide, the intermediate support carrying a blade for forcing a coil side into a core slot; a single power driven shaft carried by the frame; a cam on said shaft and a rocker arm located at one side of the shaft and cooperating with said cam and connected with the support of the first mentioned guide; a second cam on said shaft and a rocker arm at the opposite side of said shaft and cooperating with the second cam and extending through the first mentioned support and connected with the intermediate support; a third cam on said shaft and means for transmitting movement from said cam to the support for the second guide; and means carried by the first mentioned support and extending through all three of the supports and operated by a cam on said shaft for moving the second guide laterally with respect to the first guide.

8. A machine for assembling dynamo armatures comprising, in combination, a support for an armature assembly including a slotted core and coils with one active coil side of each coil inserted in each slot; a guide engageable by an uninserted coil side; means for transmitting a force intermittently to rotate the core a predetermined amount to bring an uninserted coil side into engagement with said guide to stretch that coil while locating the proper core slot in alignment with said uninserted coil side; a device for retaining the core in proper alignment with the guide and in position to maintain the uninserted coil side in engagement with the guide and in stretched condition; means for compressing the uninserted coil side against said guide; means for forcing said coil side into the aligned core slot; and power mechanism for operating all of said means in succession.

LORA E. POOLE.